Jan. 25, 1955
J. P. CARR
2,700,319
OPTICAL WHEEL ALIGNER WITH SINGLE ADJUSTABLE
BEAM REFLECTOR-DEFLECTOR
Filed Feb. 2, 1950
4 Sheets-Sheet 1
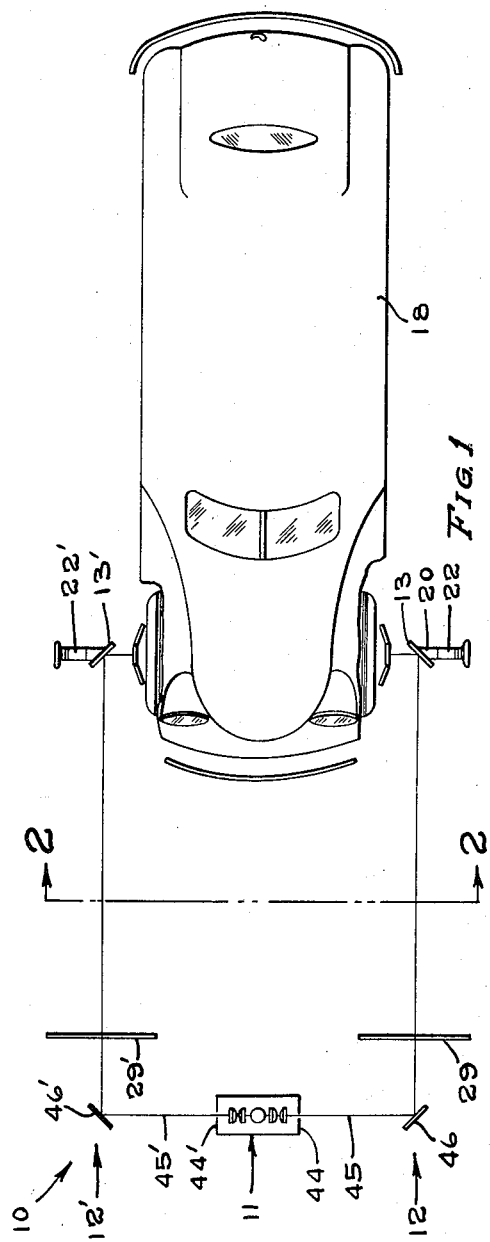
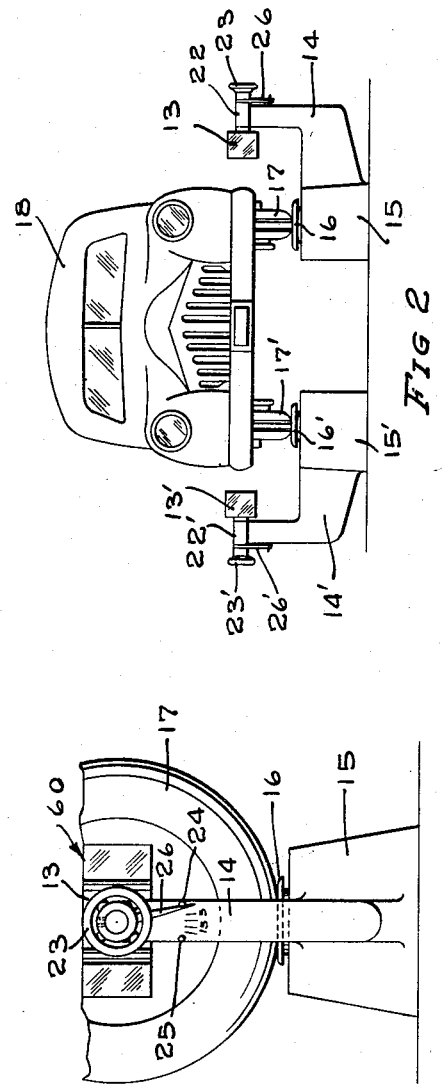
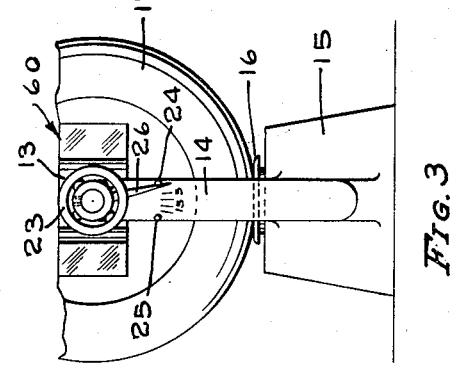
INVENTOR
JAMES P. CARR
BY
ATTORNEY

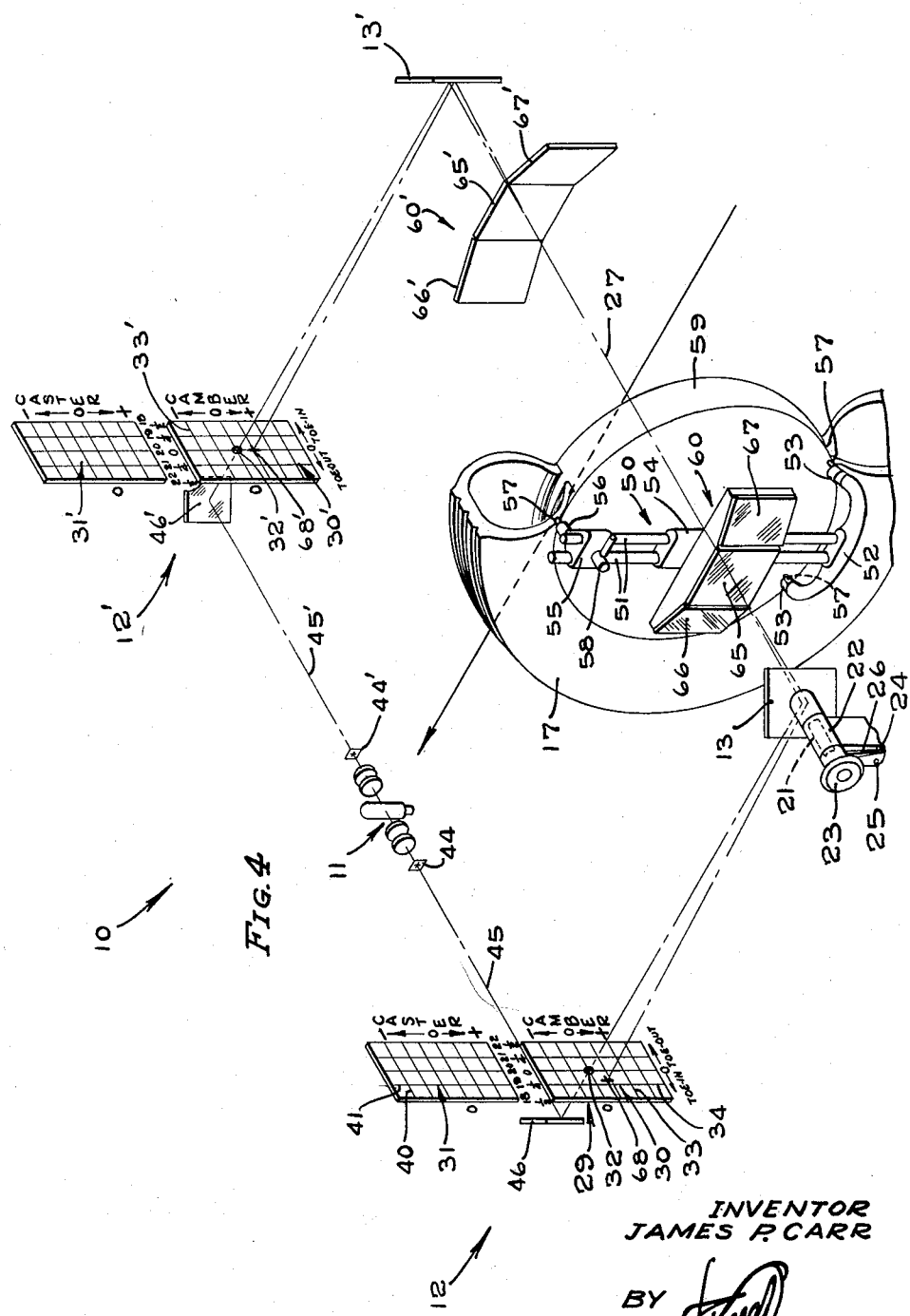

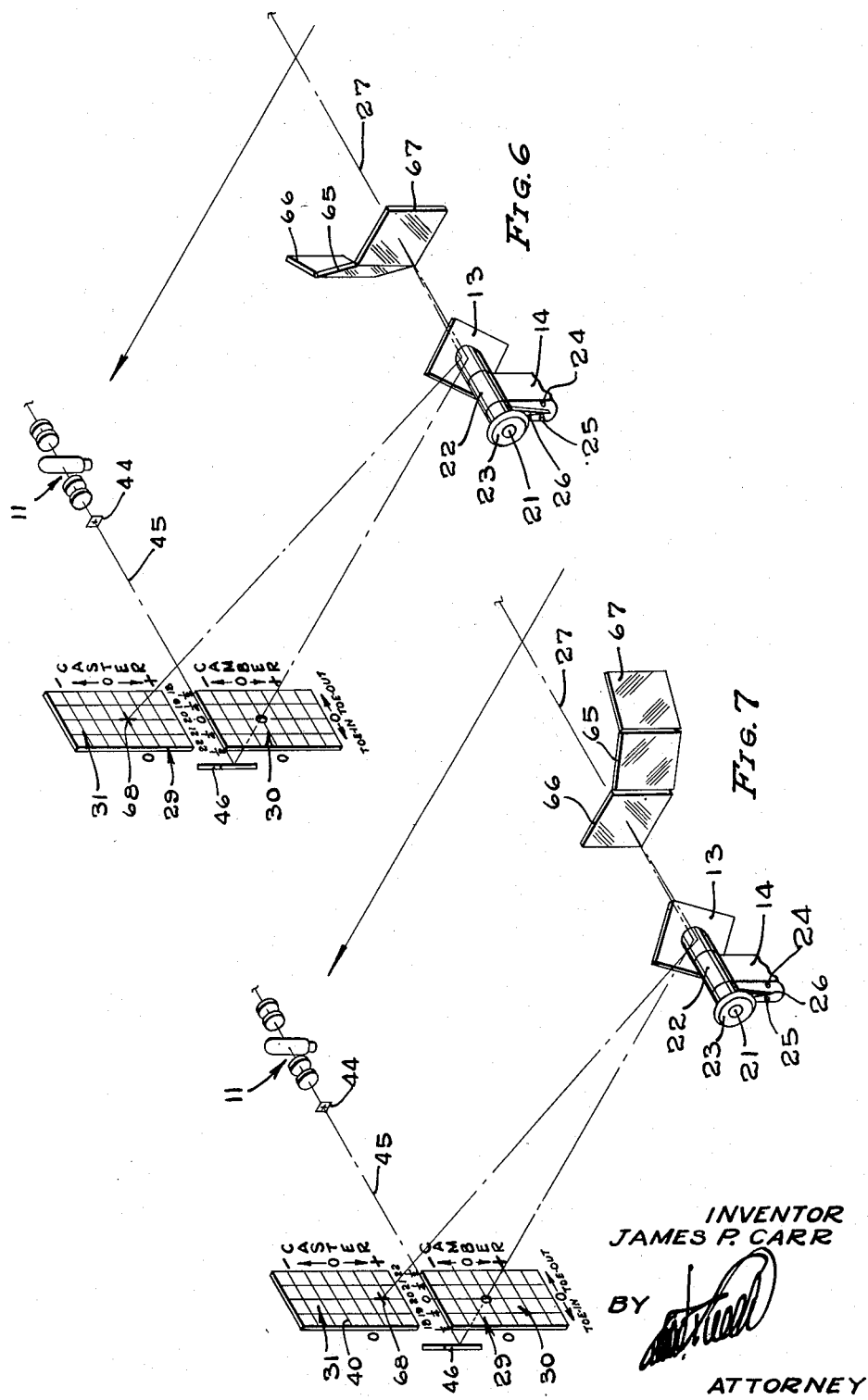

United States Patent Office 2,700,319
Patented Jan. 25, 1955

2,700,319

OPTICAL WHEEL ALIGNER WITH SINGLE ADJUSTABLE BEAM REFLECTOR-DEFLECTOR

James P. Carr, Lansing, Mich., assignor to Food Machinery and Chemical Corporation, San Jose, Calif., a corporation of Delaware Application February 2, 1950, Serial No. 141,989

7 Claims. (Cl. 88—14)

This invention relates to that class of optical instruments employed for measuring the alignment characteristics of the dirigible front wheels of an automotive vehicle, and particularly to such instruments of the type disclosed in the copending application or U. S. Letters Patent Serial No. 571,717, filed January 5, 1945, by Roland E. Wilson, and about to issue as U. S. Letters Patent No. 2,496,324.

In the Wilson device, known commercially as the Visualiner, two screens are set up in front of the vehicle, a three-faced mirror is mounted upon each of the front wheels facing laterally therefrom, and two optical units, one of which is disposed outwardly from each of said wheel-mirrors, are mounted alongside of and close to said vehicle, but supported independently thereof. Each of said units projects (1st) a chart on the screen immediately ahead thereof and (2nd) a beam of light onto the adjacent wheel-mirror, the reflection of which is deflected by a deflector on said unit to cause said deflected beam to form a cross-hair image on said screen. The charts projected onto the screens are so calibrated that the locations thereon of the cross-hair images, following a few simple standard manipulations of the apparatus and wheels, indicate precisely in degrees the amount of each of the alignment characteristics which it is desired to measure. These include camber, caster, toe-in, toe-out, and kingpin inclination.

Modifications of the Wilson apparatus are disclosed in the co-pending application of Tracy Carrigan, Serial No. 659,317, filed April 3, 1946, now Patent No. 2,601,262, and in U. S. Letters Patent to Carrigan et al., No. 2,470,090 issued May 17, 1949.

It is an object of the present invention to provide an optical instrument operating in accordance with the broad principles of the Wilson apparatus and for the same general purpose which will be substantially less expensive to build, and less susceptible to damage.

It is another object of the invention to provide an optical instrument for the purpose and of the general type above outlined which will not require a light source to be mounted independently of the automobile and just outwardly from each of the front wheels.

The specific embodiment of the Wilson apparatus disclosed in his patent above identified employs a beam divider or semi-transparent mirror through which the beam is projected against the wheel mirror and against which the beam is reflected back from the wheel mirror and which then deflects the beam onto the screen to form an indicator image. As the path along which the beam was thus originally directed onto a reflecting face of the wheel mirror was horizontal and parallel with a line intersecting the centers of the two front wheels, with the latter turned straight ahead, and as said reflecting face of the wheel mirror was almost perpendicular to the path along which said beam approached said reflecting face, there was a very slight angle between the paths of incidence and reflection of said beam as it approached and was reflected back from said reflecting face of the wheel mirror.

While in the interest of accuracy the Wilson apparatus, shown in his patent, provides for adjustment of the optical units relative to the wheel mirrors so that the beam of light in traveling from the wheel mirror to the screen always traverses substantially the same distance, this adjustment is not essential in such an apparatus in order to get readings which are accurate within the limits required in commercial practice. This is because of the small angle between the paths taken by the beam as it approaches and is reflected from the wheel mirror reflecting face.

While it is highly desirable to have bright indicator images appear on the screen in the Wilson apparatus designed for commercial use, the passing of the light beam through a beam divider absorbs a sufficient portion of the light so that it is difficult to get an image on the screen of an intensity permitting the apparatus to be used out-of-doors.

It is another object of this invention to provide an optical wheel aligner embodying the general principles of the Wilson invention, and achieving the ends thereof with a beam of light projected against the wheel mirror along a path substantially parallel with the line intersecting the centers of the wheels with the latter turned straight ahead and therefore obviating the necessity in commercial practice of adjusting the distance between the optical units and the wheel mirrors, and yet which does not require the light beam to pass through the beam divider mirror as is the case in the apparatus disclosed in the Wilson patent.

The manner of accomplishing the foregoing objects, as well as other objects and advantages will be made manifest in the following description taken in connection with the accompanying drawings, in which:

Fig. 1 is a diagrammatic plan view of the preferred embodiment of the invention, and illustrating its relation with an automobile when used to measure certain alignment characteristics of the front wheels thereof.

Fig. 2 is a sectional view taken on the line 2—2 of Fig. 1.

Fig. 3 is an enlarged fragmentary side elevational view of that portion of the apparatus associated with the left wheel of said automobile in measuring certain alignment characteristics thereof.

Fig. 4 is a diagrammatic perspective view of the apparatus of the invention illustrating the manner in which this is used to measure the camber of each of said front wheels and the toe-in between said wheels.

Fig. 6 is a diagrammatic perspective view illustrating the first two steps in the use of said apparatus in measuring caster of the left front wheel of said automobile.

Fig. 7 is a similar view to Fig. 6 and illustrates the final step in measuring the caster of said wheel.

Figure 5:
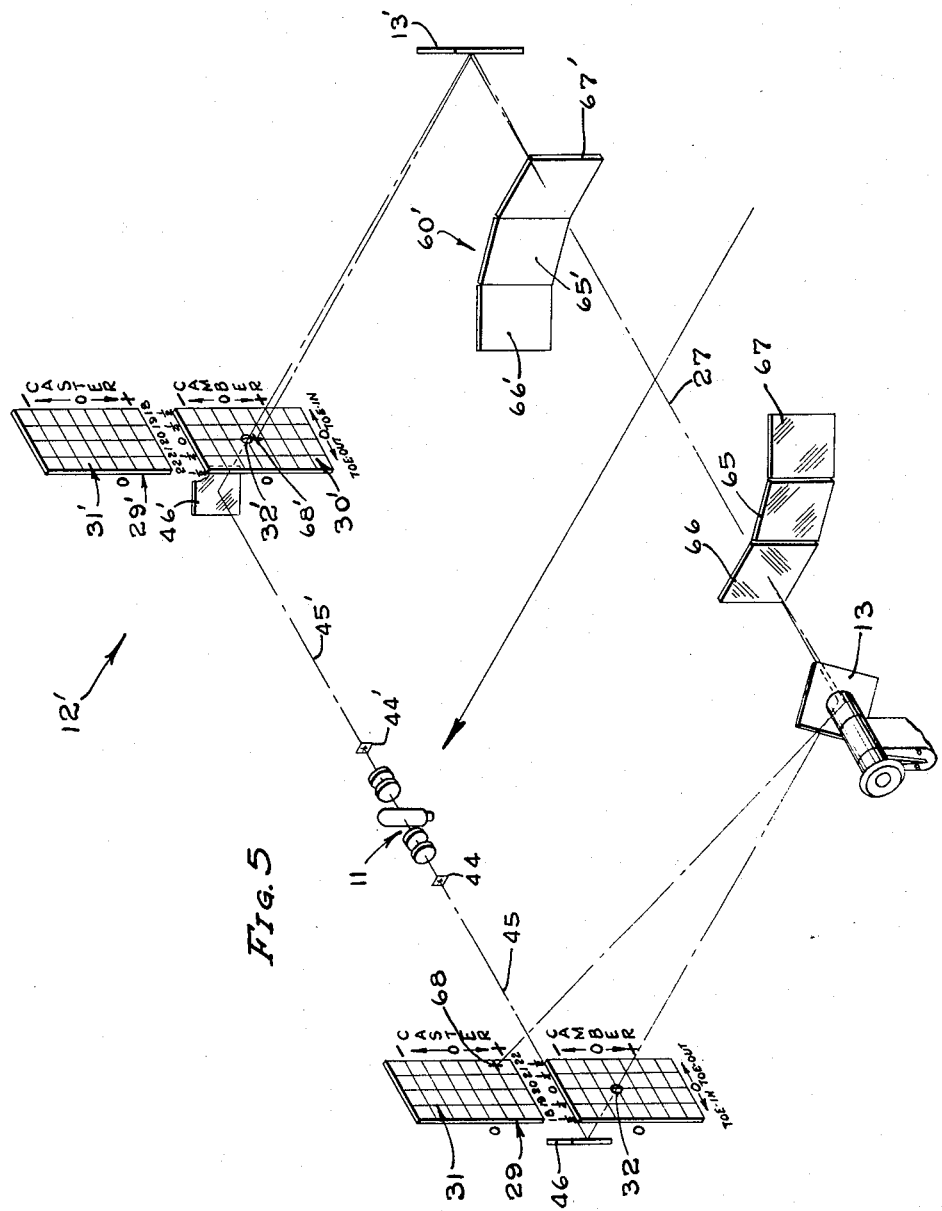
Fig. 5 is a diagrammatic perspective view illustrating the manner in which said apparatus is used to measure the steering geometry of said two front wheels.

Referring specifically to the drawings, the invention is there shown as embodied in an apparatus 10 (Figs. 1, 2, 3, and 4) which includes a single light beam projector 11 and left and right optical units 12 and 12'. As the units 12 and 12' are reverse duplicates of each other, a description of the left unit 12 will suffice for both. Subsequent reference to any detail of the unit 12' will be by use of the reference numeral applied to the corresponding detail in describing unit 12, with prime attached.

Optical unit 12 includes a reflector-deflector 13 mounted on the upper end of a bracket 14 extending horizontally and upwardly from a pedestal 15 having a turn-table 16. A similar pedestal 15', turn-table 16' and bracket 14' are provided on the right side of the apparatus, turn-tables 16 and 16' being provided for supporting front wheels 17 and 17' of an automobile 18. A suitable ramp (not shown) is provided for association with the pedestals 15 and 15' and on which automobile 18 is driven to raise it up to the level of the turn-tables 16 and 16', and which is close enough to these so that the front wheels of the automobile can be driven directly from the ramp onto these turn-tables.

The reflector-deflector 13 comprises a plane mirror carried on a mount 20 from which a shaft 21 extends through a bearing 22 fixed on the top of the bracket 14 and has secured on the outer end thereof a hand wheel 23. The bracket 14 has a pair of stop pins 24 and 25 and a dial hand 26 extends downwardly from the hand wheel 23 between said pins so that rotation of the hand wheel 23 is limited thereby.

The axis of the bearing 22 is in alignment with the axis of the bearing 22' of optical unit 12'. When arranging the automobile 18 for measurement of alignment characteristics it is placed as nearly as possible equidistant from reflector-deflectors 13 and 13' and with a line 27 connecting the centers of the wheels 17 and 17' (with these turned straight ahead) in coincidence with the axis of the bearings 22 and 22'.

The mirror 13 is normally disposed vertically and is set at an angle of 45° with its axis of rotation.

Supported in any suitable manner in front of the automobile 18 at a distance of approximately six feet from line 27 is a screen 29 provided with calibrations to form camber and caster charts 30 and 31 respectively. The camber chart has vertical and horizontal zero lines at the intersection of which an aperture 32 is formed in said screen. The camber chart has horizontal calibrations 33 for use in the measurement of camber and vertical calibrations 34 for use in the measurement of toe.

The caster chart 31 is preferably located above camber chart 30 and has horizontal calibrations 40 for measuring caster and vertical calibrations 41 for the measurement of steering geometry (in some cases referred to as toe-out-on-turns).

The projector 11, which is disposed on the opposite side of the screens 29 and 29' from the automobile 18, has cross-hair masks 44 and 44' through which it projects beams 45 and 45' in opposite directions from the projector along a line which is parallel to and in the same horizontal plane as line 27.

Vertical mirrors 46 and 46' disposed in the paths of said beams and angled at 45° therewith, deflect said beams to pass through apertures 32 and 32' and impinge upon the reflector-deflectors 13 and 13' at their mid-points. The beams 45 and 45' thus approach reflector-deflectors 13 and 13' at right angles with and in the same horizontal plane with the rotational axis of said reflector-deflectors.

Associated with the wheel 17 and cooperating with the optical unit 12 is a mirror mount 50, the detailed structure of which is fully disclosed in U. S. Letters Patent to Herbert G. Holmes, No. 2,475,502, on a Wheel Mirror Mount. This mount, as shown in Fig. 4, includes a pair of bars 51 fixed on a bracket 52 on which are formed jaws 53. Slideable on the bars 51 is a mirror support 54 and a clamp 55 on which is provided a jaw 56. Each of the jaws 53 and 56 has an inner face, these faces lying in a plane which is parallel with the plane of the bars 51, these jaws having teeth 57 in the form of hardened screws extending inwardly from said faces.

Clamp 55 has a cam 58 which is manually operable when the mirror mount 50 has been positioned as shown in Fig. 4 on the rim 59 of the wheel 17 to sink the teeth 57 into this rim and thereby secure the mount 50 in place on the rim with the inner faces of the jaws 53 and 56 snugly bearing against the peripheral outer flange of the rim 59.

Pivotally mounted on the support 54 on an axis perpendicular with the plane of the bars 51, is a wheel mirror assembly 60, and fixed on this assembly, with its reflecting surface parallel with said plane, is a middle plane mirror 65, while wing plane mirrors 66 and 67 are also fixed thereon, these wing mirrors being slanted away from the middle mirror 65 at angles of 20° therewith.

The axis on which the assembly 60 is pivoted on the support 54 is above its center of gravity so that the assembly 60 assumes a horizontal position whenever released from restraint.

Operation

Measurement of the alignment characteristics of the front wheels of automobile 18 begins by properly positioning this automobile with the front wheels thereof equidistant from reflector-deflectors 13—13' and equipped with wheel mirrors 60 and 60'. The light projector 11 is then energized to direct beams 45 and 45' against the mirrors 46 and 46' from which said beams are reflected through screen apertures 32 and 32' onto the reflector-deflectors 13 and 13'. The latter reflect these beams inwardly against one of the plane mirror faces of the wheel mirrors 60—60' from which they are reflected back against the reflector-deflectors which in turn deflect the beams back in almost the opposite direction from that in which they originally proceeded to impinge, in the first instance, against the reflector-deflectors 13 and 13'. So returned, beams 45 and 45' impinge upon the screens 29 and 29' to form cross-hair indicator images 68 and 68'.

The relation of the dial hands 26—26' to the reflector-deflectors 13—13' is such that the latter are positioned, when the dial hands are moved against the stops 24—24', so that in the absence of any camber in the wheel 17—17', the indicator images 68—68' are projected, when said wheels are turned straight ahead, onto the horizontal zero lines of the camber charts 30—30'.

The first measurement to be made is generally camber and toe-in, and is illustrated in Fig. 4. Here the wheels are shown turned approximately straight ahead so as to bring the indicator image 68' onto the vertical zero line of camber chart 30'. The camber of wheel 17' is then measured by the relation of the indicator image 68' to the horizontal calibrations 33' of chart 30'. In Fig. 4, wheel 17' is shown as having a positive camber of 1°.

With the wheels thus set, the position of the indicator image 68 relative to the horizontal calibrations 33 of chart 30 measures the camber of wheel 17 which, as shown in Fig. 4, is positive three-quarters of one degree. The relation of the indicator image 68 to the vertical calibrations 34 of chart 30 now also indicates the toe-in between the wheels 17 and 17', this being shown in Fig. 4 as three-sixteenths of an inch.

The measurement of steering geometry illustrated in Fig. 5 is effected by turning one of the wheels, as for instance the left wheel 17', inwardly so as to bring the mirror reflecting face 67' into the position shown in this view whereby the indicator image 68' is projected onto the vertical zero line of camber chart 30' (or upon the vertical 20—20 line of caster chart 31', in case the reflector-deflectors 13—13' should be rocked to elevate the indicator image 68' onto the latter chart).

With the wheels so positioned, the reflector-deflector 13 is now rotated to project the indicator image 68' onto the caster chart 31, where the relation of this image with the vertical calibrations 41 indicate the steering geometry angle with which the wheel 17 is turned outwardly. In Fig. 5 this is shown to be slightly over 21½°.

The measurement of caster, as of left wheel 17, starts, as illustrated in Fig. 6, with turning this wheel inwardly approximately 20° and then rocking the reflector-deflector 13 so that the indicator image 68 is projected onto the caster chart 31 at the intersection of the horizontal zero line and the vertical 20—20 line thereof.

Leaving the reflector-deflector 13 at thus adjusted, the wheel 17 is now turned from its inturned position to a position in which it is outturned approximately 20° from straight ahead (Fig. 7) which places the wheel mirror 66 in such a position as to cause the light beam 45 to be reflected thereby and again project the indicator image 68 onto the vertical 20—20 calibration of caster chart 31, the relation of said indicator image in its present position to the horizontal calibrations 40 of this chart giving the correct measure of the caster of the wheel 17. In the example illustrated in Fig. 7, this is a little over 1½° negative caster.

It is to be noted that while the Wilson apparatus, disclosed in the aforesaid Wilson patent, provides for setting up the apparatus so that there is always a uniform distance between the wheel mirror and the point at which the beam reflected therefrom impinges upon the deflector for deflecting the beam onto the screen, this distance varies slightly in the apparatus 10 by virtue of the fact that the reflector-deflectors 13—13' are mounted on rigid brackets 14 and 14' with a fixed distance between these mirrors. As the width of automobiles, on which the apparatus 10 is used to check alignment characteristics, varies as much as six inches, some variation is unavoidable in the spacing between the wheel mirrors and these reflector-deflectors even though the automobile being tested is centrally located. This variation does not result, however, in a sufficient error in the measurements indicated by the apparatus 10 to be of any consequence commercially. The main reason for this is the setting of the reflector-deflectors 13 and 13' at 45° with their mounting axis so that the light beams 45 and 45' which strike these reflector-deflectors at an angle of 45° therewith are reflected inwardly almost precisely along said axis. As each measurement of a wheel alignment characteristic is taken with a wheel mirror reflecting face disposed almost normal to that axis, each of the light beams 45 and 45' is reflected back by that reflecting face onto the corresponding reflector-deflector 13 or 13' at a very small angle. A difference of an inch or two in the spacing between the wheel mirrors and the reflector-deflectors thus causes such a slight error in the reading of the alignment characteristic produced by the apparatus 10 that this apparatus is practically as satisfactory in its commercial results as the Wilson apparatus, and is much less expensive to build and maintain.

The claims are:

1. An apparatus for measuring an alignment characteristic of one of a pair of dirigible wheels of an automobile which comprises: a mirror mounted on said wheel when in use and facing laterally therefrom; a reflector disposed alongside said automobile and mounted independently thereof and close to said wheel mirror; means for projecting a beam of light alongside said automobile and onto said reflector, the latter being positioned to reflect said beam onto said wheel mirror and to intercept said beam, when the latter is reflected back from said wheel mirror, to deflect said reflected beam back alongside said automobile in the general direction of said projecting means; a screen interposed in the path of said deflected beam to form an indicator image thereon; a mount for supporting said reflector; rotary means provided on said mount and to which said reflector is secured whereby said reflector may be rotated about an axis substantially parallel with a line connecting the centers of said wheels (with the latter turned straight ahead); and means providing on said screen a pair of charts disposed one above the other, said rotation of said reflector permitting the selective projection of said indicator image on either one of said charts, each of said charts having calibrations so that, when said image is projected thereon and when said wheel is turned about its king-pin to a given measuring position, the calibrations on said chart provide a reading of an alignment characteristic of said wheel by virtue of the location on said chart of said indicator image.

2. A combination as in claim 1 in which indexing means is provided on the mount of said reflector for indexing said reflector in a neutral relation relative to one of said charts to produce a correct reading on said chart of an alignment characteristic which said chart is calibrated to measure.

3. An apparatus for measuring an alignment characteristic of one of a pair of dirigible king-pin mounted wheels of an automobile, which comprises: a mirror mounted on said wheel when in use and facing laterally therefrom; means for projecting a beam of light towards said automobile from the front and substantially parallel therewith in a vertical plane lying close to and alongside said automobile; a reflector mounted independently of said automobile and close to and outwardly from said wheel mirror and in the path of said beam, said reflector being disposed at an angle of substantially 45° relative to said beam whereby the beam is reflected from said reflector inwardly against said wheel mirror and reflected back from the latter onto said reflector and then deflected forwardly by said reflector; a screen disposed in front of said automobile and substantially perpendicular with said plane and close to the path of said beam and in a position to intercept the beam, after the latter is deflected forwardly from said reflector, to form an indicator image on said screen; means providing a chart on said screen with said indicator image falling on said chart when said wheel is turned about its king-pin to a given measuring position, said chart having calibrations which provide a reading of said alignment characteristic by virtue of the location on said chart of said indicator image, the plane of said screen intersecting the path of said projected beam and said chart providing means providing a camber chart and a caster chart, one of which is above the other; and means for rotationally adjusting said reflector on a horizontal axis substantially perpendicular to said path to selectively superimpose said indicator image on one or the other of said charts in correct relation to the calibrations thereof.

4. An apparatus for measuring caster of a king-pin mounted dirigible wheel of an automobile which comprises: an optical device including means for projecting a beam of light alongside said automobile, and a reflector for reflecting said beam of light inwardly towards said wheel; a mirror means on a mounting device, mounted when in use in upright position on said wheel, said mirror means being mounted to present to said beam, in each of two different positions of said wheel turned equally in opposite directions from straight ahead, a plane reflective mirror face reflecting said beam outwardly away from said wheel and back onto said reflector from which said beam is thence deflected back alongside said automobile in the opposite direction from but close to the line of its original projection aforesaid; a screen disposed to intercept said deflected beam to form an indicator image on said screen after said beam has been reflected from said mirror face in each of said two positions of said wheel; means providing a chart on said screen, said chart having calibrations which provide a reading thereon of the caster of said wheel by the difference vertically between the locations of said indicator images on said chart when said wheel is placed successively in said two positions, and means for rotating said reflector on a horizontal axis to effect a zero reading on said chart with said wheel in the first of said two positions whereby the reading of said indicator image on said chart with said wheel in the other of said two positions will indicate the amount of caster in said wheel.

5. An apparatus for measuring the camber and caster of a king-pin mounted dirigible wheel of an automobile which comprises: an optical device mounted independently of said wheel, said device including means for projecting a beam of light alongside said automobile, and a reflector for reflecting said beam of light inwardly towards said wheel; a mirror means on a mounting device, mounted when in use in upright position on said wheel, said mirror means being mounted to present to said reflected beam, with said wheel turned straight ahead or in each of two positions of said wheel turned equally in opposite directions from straight ahead, a plane reflective mirror face reflecting said inwardly reflected beam outwardly away from said wheel and against said reflector so as to be deflected from the latter back alongside said automobile in the opposite direction from but close to the line of its original projection aforesaid; a screen disposed to intercept said deflected beam to form an indicator image thereon; means providing camber and caster charts on said screen, said camber chart having calibrations providing a reading of the camber of said wheel from the position in which said indicator image is projected on said screen with said wheel turned straight ahead, and said caster chart having calibrations thereon providing a reading of the caster of said wheel from the vertical spacing between the positions in which said indicator image is projected on said screen with said wheel turned successively in different directions from straight ahead as aforesaid, and means for rotating said reflector on a substantially horizontal axis to provide a zero reading on said caster chart with said wheel turned from straight ahead as aforesaid in one of said directions whereby a final reading of the caster of said wheel will be indicated on said caster chart by the position of said indicator image thereon when said wheel is then shifted to the other of its aforesaid positions in which it is turned in the opposite direction from straight ahead.

6. Apparatus for measuring alignment characteristics of a pair of steerable wheels of an automobile, comprising; two mirrors mounted respectively on said wheels and facing laterally therefrom; means for projecting beams of light toward said automobile from the front thereof generally parallel to the sides thereof and outwardly of but adjacent said steerable wheels; two reflectors mounted respectively outwardly of said wheels with each reflector in position to intercept the corresponding one of said projected beams and reflect the same inwardly to the mirror on the adjacent wheel and to receive said beam when the latter is reflected outwardly from said wheel mirror and direct the same forwardly closely adjacent said corresponding projected beam; and two charts disposed respectively in the paths of said forwardly directed beams, said charts being arranged in generally coplanar relationship transversely of said beams and spaced forwardly from the front of said automobile.

7. Apparatus for measuring alignment characteristics of a pair of steerable wheels of an automobile, comprising: two compound mirror means each of which means includes angularly related reflecting faces, said two mirror means being mounted respectively on said wheels with said reflecting faces of each mirror means facing laterally and slightly forwardly and slightly rearwardly, respectively, therefrom; means for projecting beams of light toward said automobile from the front thereof generally parallel to the sides thereof and outwardly of but adjacent said steerable wheels; two reflectors mounted respectively outwardly of said wheels with each reflector in position to intercept the corresponding one of said projected beams and reflect the same inwardly to the mirror means on the adjacent wheel, said reflectors being arranged to also receive the beams reflected outwardly from corresponding reflecting faces of said two mirror means when said wheels are turned from their straight-ahead position and direct both said outwardly reflected beams forwardly closely adjacent said projected beams; and two charts disposed respectively in the paths of said forwardly directed beams, said charts being arranged in generally coplanar relationship transversely of said beams and spaced forwardly from the front of said automobile.

References Cited in the file of this patent

UNITED STATES PATENTS

| | | |
|---|---|---|
| 1,859,020 | Brown | May 17, 1932 |
| 1,977,027 | Vaughan | Oct. 16, 1934 |
| 1,996,756 | Eitzen | Apr. 9, 1935 |
| 2,292,969 | Peters | Aug. 11, 1942 |
| 2,410,339 | Creagmile | Oct. 29, 1946 |